US012732049B2

(12) United States Patent
Hikita et al.

(10) Patent No.: US 12,732,049 B2
(45) Date of Patent: Sep. 8, 2026

(54) ROTARY ELECTRIC MACHINE

(71) Applicant: DENSO TRIM CORPORATION, Mie-gun (JP)

(72) Inventors: Takahiko Hikita, Mie-gun (JP); Koji Mori, Mie-gun (JP)

(73) Assignee: DENSO TRIM CORPORATION, Mie-gun (JP)

( * ) Notice: Subject to any disclaimer, the term of this patent is extended or adjusted under 35 U.S.C. 154(b) by 182 days.

(21) Appl. No.: 18/816,009

(22) Filed: Aug. 27, 2024

(65) Prior Publication Data

US 2024/0421648 A1 Dec. 19, 2024

Related U.S. Application Data

(63) Continuation of application No. PCT/JP2023/002026, filed on Jan. 24, 2023.

(30) Foreign Application Priority Data

Mar. 24, 2022 (JP) ................................ 2022-049009

(51) Int. Cl.
*H02K 3/28* (2006.01)
*H02K 1/18* (2006.01)
*H02K 3/50* (2006.01)
*H02K 11/30* (2016.01)

(52) U.S. Cl.
CPC .............. *H02K 3/28* (2013.01); *H02K 1/187* (2013.01); *H02K 3/50* (2013.01); *H02K 11/30* (2016.01); *H02K 2203/06* (2013.01)

(58) Field of Classification Search
CPC .......... H02K 3/38; H02K 11/30; H02K 1/187; H02K 3/50; H02K 2203/06
USPC .......................................................... 310/208
See application file for complete search history.

(56) References Cited

U.S. PATENT DOCUMENTS

2010/0181851 A1 7/2010 Shinkawa

FOREIGN PATENT DOCUMENTS

| | | | | |
|---|---|---|---|---|
| JP | 2004222412 A * | 8/2004 | | |
| JP | 2010115041 A | 5/2010 | | |
| JP | 2016093132 A * | 5/2016 | ............... | H02K 3/18 |
| WO | WO-2018179790 A1 * | 10/2018 | ............ | H02K 11/25 |
| WO | WO-2019065452 A1 * | 4/2019 | ............... | H02K 3/52 |

* cited by examiner

*Primary Examiner* — Jose A Gonzalez Quinones
(74) *Attorney, Agent, or Firm* — Harness, Dickey & Pierce, P.L.C.

(57) ABSTRACT

Coils are divided into “n” systems. Each divided coils are arranged continuously within an angular range obtained by dividing 360 degrees by “n”. A single conductor is wound continuously in a circumferential direction to provide the coils in the same phase. Lead wires and winding start terminals of the coils of the conductors are connected by winding start extension wires. Lead wires and winding end terminals of the coils of the conductors are connected by winding end extension wires. Connection portions to the lead wires are fixed to the stator with clips. The clips are provided with the number “n”, and are located substantially middle to a dividing line that divides into “n”.

7 Claims, 17 Drawing Sheets

FIG. 17
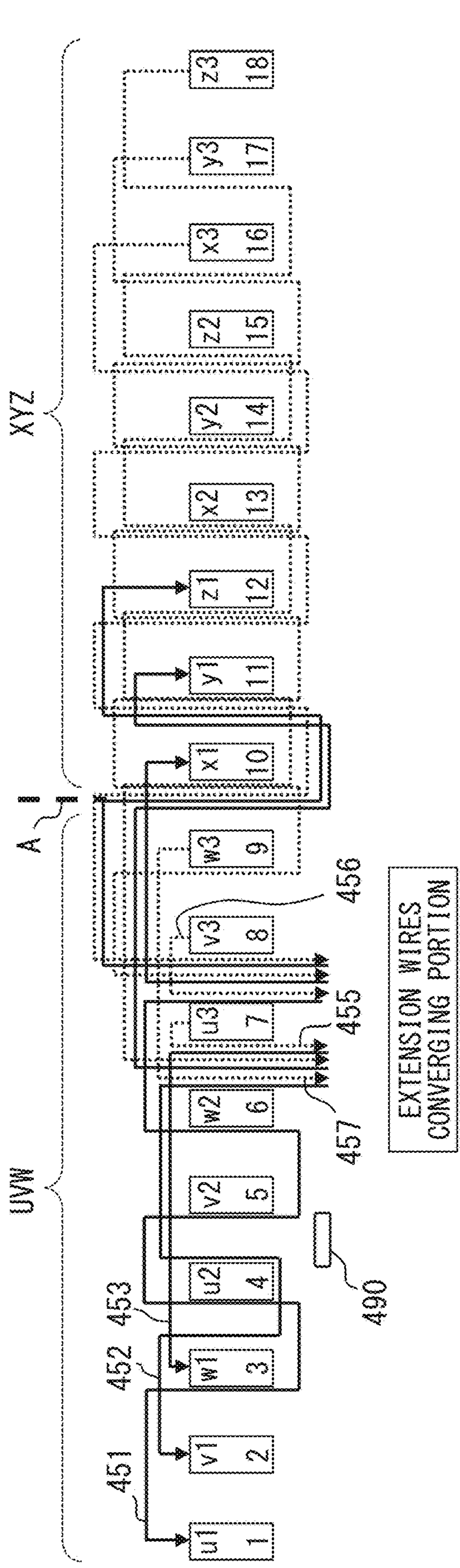
XYZ
A
UVW
EXTENSION WIRES CONVERGING PORTION
451
452
453
455
456
457
490
u1 1
v1 2
w1 3
u2 4
v2 5
w2 6
u3 7
v3 8
w3 9
x1 10
y1 11
z1 12
x2 13
y2 14
z2 15
x3 16
y3 17
z3 18

FIG. 18
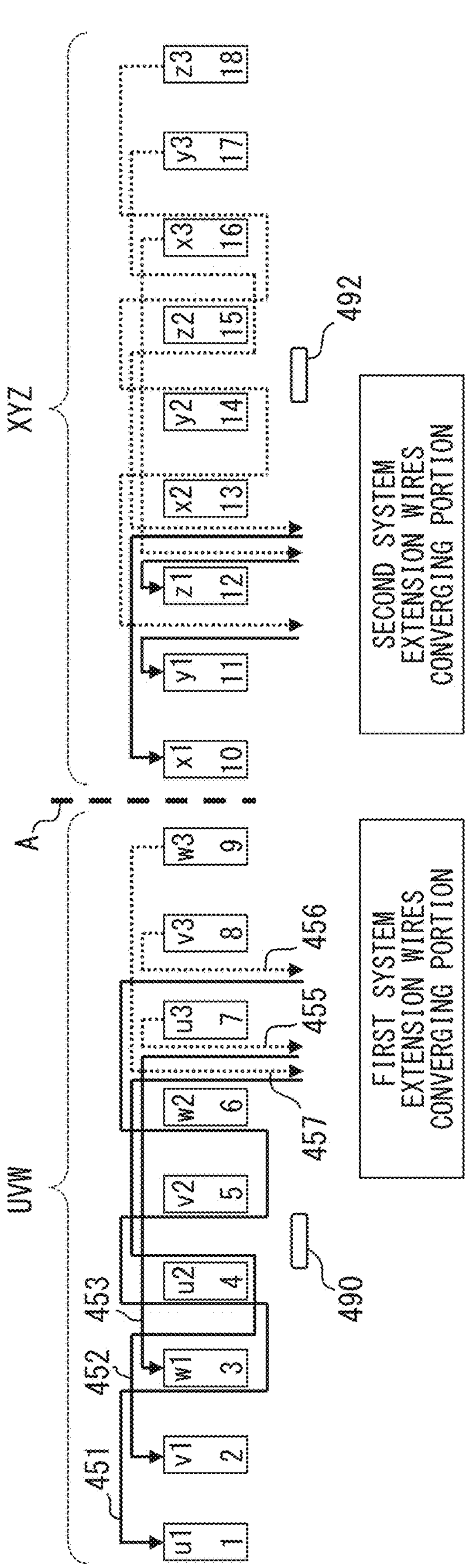

FIG. 19

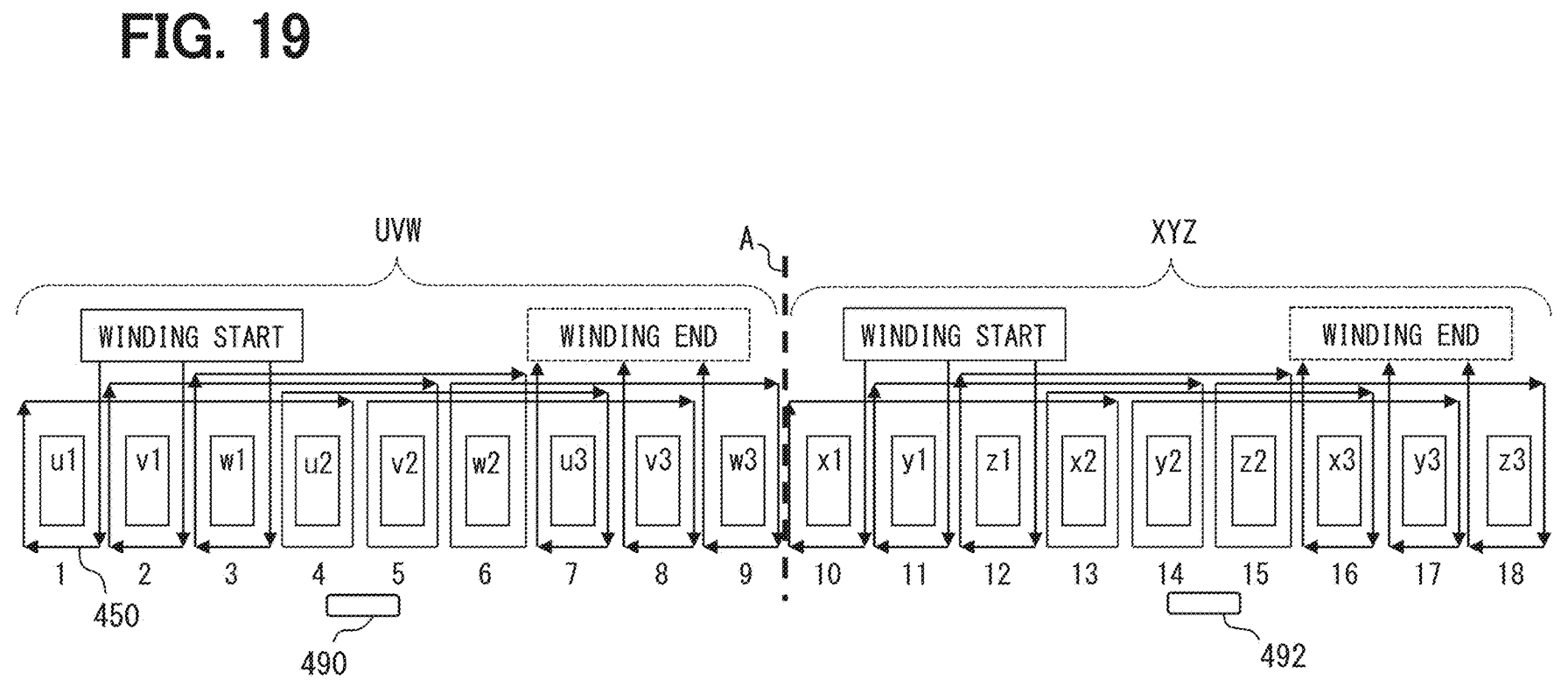

UVW
XYZ
A
WINDING START
WINDING END
WINDING START
WINDING END
u1 v1 w1 u2 v2 w2 u3 v3 w3 x1 y1 z1 x2 y2 z2 x3 y3 z3
1 2 3 4 5 6 7 8 9 10 11 12 13 14 15 16 17 18
450
490
492

FIG. 22

DELTA CONNECTION
u
v
w
x
y
z
STAR CONNECTION
u
v
w
x
y
z
OUTPUT VOLTAGE
time

ROTARY ELECTRIC MACHINE

CROSS REFERENCE TO RELATED APPLICATION

The present application is a continuation application of International Patent Application No. PCT/JP2023/002026 filed on Jan. 24, 2023, which designated the U.S. and is based on and claims the benefit of priority from Japanese Patent Application No. 2022-49009 filed on Mar. 24, 2022, and all the contents of the applications are incorporated by reference.

TECHNICAL FIELD

The description in this specification relates to a rotary electric machine.

BACKGROUND

The rotary electric machines are connected with kinetic sources, such as an internal combustion engine. For example, a rotary electric machine is known as a generator or a starter for a two-wheeled vehicle. The rotary electric machines generate Joule heat. In addition, the rotary electric machines receive heat from kinetic sources that rotates the rotary electric machines. Further, the rotary electric machines generate vibrations. In addition, the rotary electric machines receive vibrations from the kinetic sources. In the above aspects, or in other aspects not mentioned, there is a need for further improvements in a rotary electric machine.

SUMMARY

A first aspect of the present disclosure is a rotary electric machine comprising: a rotor having a plurality of permanent magnets arranged in a circumferential direction and being rotatable together with a shaft; and a stator having a plurality of teeth and a plurality of coils arranged on the teeth and radially outer ends of the teeth face the permanent magnets. A stator in the first aspect of the present disclosure comprises a base portion which has a disk-shape and is fixed to a fixing portion, teeth with "x" numbers extending radially outward from the base portion, and coils with "x" numbers arranged on the teeth and formed by winding a conductor.

A first aspect of the present disclosure includes a lead wire electrically connected to a conductor, a winding start extension wire and a winding end extension wire connecting the lead wire to a winding start terminal of the coil of the conductor and a winding end terminal of the coil of the conductor, a clip which fixes a connection portion between the winding start extension wire and the winding end extension wire and the lead wire to a stator, and a control device electrically connected to the lead wire and controlling the input and output power of the coil.

A first aspect of the present disclosure is that a control device controls current supply to coils in a k-phase manner, the coils are divided by "n" into "n" systems, where "n" is a natural number that is equal to or greater than 2 and is equal to or less than a number obtained by dividing number "x" of teeth by "k" of the phases of the coils, and the n-divided coils are continuously arranged within an angular range obtained by dividing 360 degrees by "n". The conductor is wound continuously in the circumferential direction with coils of the same phase, the number of which is obtained by dividing the number "x" of the teeth by "n" and "k" of the phases of the coils, the number of clips is "n", and the clips are fixed to the base portion of the stator near the coil located substantially middle between a dividing lines that divide the coils into "n". The winding start extension wires and the winding end extension wires are arranged in the teeth in a sewing manner and are converged at a converging portion located near a position where the clip is fixed.

In the first aspect of the present disclosure, since the clip that secures a connection portion between the extension wires and the lead wires to the stator is fixed to the base portion of the stator near the coil that is located substantially middle of the dividing line that divides the coils into "n", it is possible to shorten a length of the extension wires. Therefore, in the first aspect of the present disclosure, an increase in the mass of the lead wires are suppressed, and a deterioration in a vibration resistance of the lead wires is also suppressed.

In the first aspect of the present disclosure, it is assumed that the winding start extension wires and the winding end extension wires are arranged in a sewing manner and are converged at a converging portion located near the position where the clip is fixed. Therefore, the winding start extension wires and the winding end extension wires are concentrated at the converging portion, which causes deterioration of heat dissipation. In contrast, the first aspect of the present disclosure uses "n" clips, so that the number of lead wires bound by the clips can be reduced. As a result, the number of extension wires covering the coils is reduced, and a cooling air flow around the coil allows smooth flow, it is possible to reduce factors that lead to poor heat dissipation caused by an arrangement of the winding start extension wires and the winding end extension wires, including converging portions. This also helps to prevent the temperature rise of the coil. In addition, the number of lead wires bundled with the clip can be reduced. Therefore, it is possible to suppress a deterioration of a heat dissipation performance of the coil due to the lead wires.

In a second aspect of the present disclosure, the base portion of the stator is fixed to the fixing portion via fixing holes, and the fixing holes are arranged so as to be substantially symmetrical with respect to the dividing line that divides the coils into "n". It is possible to make the vibration behavior of the "n" systems of the extension wires and the lead wires the same by arranging both the fixing holes of the stator and the clips symmetrically with respect to the dividing line. Thereby, it is possible to improve a vibration resistance of the extension wires and the lead wires. That is, if it is not arranged symmetrical, a relatively large vibration stress is not applied to any of the first to n-th systems. If they are arranged substantially symmetrical, the vibration stress in the system to which the large vibration stress is applied can be reduced. As a result, the extension wires and the lead wires have improved vibration resistance. In the present disclosure, "substantially symmetrical" does not necessarily mean that strict symmetry is required. It permits freedom of arrangement within a range that does not adversely affect balance considering assembly positions, etc.

A third aspect of the present disclosure is that the control device controls the input and output power of the coils to three phases, "n" being an even number, and the control device controls current supply so that an input and output powers are in opposite phases by arranging winding directions of the coils belonging to an odd-numbered system and the coils belonging to an even-numbered system in opposite directions. This makes it possible to suppress vibrations of the rotary electric machine itself caused by induced electromotive forces in the coils, further improving vibration resistance.

In a rotary electric machine according to another aspect of the present disclosure, the rotary electric machine, comprising: a rotor having permanent magnets providing a plurality of magnetic poles arranged along a circumferential direction; a stator including a base portion having a disk-shape, a plurality of teeth extending radially outward from the base portion and having radially outer ends facing the permanent magnets, and a plurality of coils arranged on each of the plurality of teeth and formed by winding a conductor; a plurality of winding start extension wires and a plurality of winding end extension wires provided by the conductors and extending along the stator from winding start terminals of the coils and winding end terminals of the coils, and a plurality of lead wires electrically connected at a plurality of connection portions; a plurality of clips which fix the plurality of coupling portions to the stator, wherein a number of poles of the plurality of teeth is "x", and wherein the coils are divided into a plurality of systems by a division number "n", and wherein the coils belonging to each system provide windings having a number of phases "k", and wherein the coils belonging to each system provide windings having a number of phases "k", and wherein the division number "n" is a natural number that is equal to or greater than 2 and is equal to or smaller than the number obtained by dividing the number of poles "x" by the number of phases "k", and wherein the coils belonging to each system are arranged continuously within an angular range obtained by dividing 360 degrees by the division number "n", and wherein a number, which is calculated by dividing the number of poles "x" by the division number "n" and the number of phases "k", of the coils are wound by the conductor that is series and continuous along the circumferential direction in each one of the systems, and wherein a number of the plurality of clips is equal to the division number "n", and wherein the plurality of clips are fixed to the base portion near the coils located substantially middle of a dividing line that divides the coils, and wherein the winding start extension wires and the winding end extension wires are arranged in the teeth in a sewing manner and are converged at converging portions located near positions where the clips are fixed.

In the rotary electric machine according to another aspect of the present disclosure, the base portion has a plurality of fixing holes for fixing to a fixing portion to which the base portion is fixed, and the fixing holes are arranged so as to be approximately symmetrical with respect to the dividing line.

In the rotary electric machine according to another aspect of the present disclosure, the number of phases "k" is three, the division number "n" is an even number, and the plurality of coils belonging to the odd-numbered system and the plurality of coils belonging to the even-numbered system are wound so that their winding directions are opposite to each other.

The rotary electric machine according to another aspect of the present disclosure further includes a control device electrically connected to the plurality of lead wires and controlling the input/output power of the plurality of coils to AC with a number of phases "k", and the control device controls the input/output power of the plurality of coils belonging to the odd-numbered system and the input/output power of the plurality of coils belonging to the even-numbered system so that they are in opposite phase to each other.

BRIEF DESCRIPTION OF DRAWINGS

FIG. 5 is a wiring diagram showing coils, extension wires, and lead wires.

FIG. 13 is a front view showing another example of an arrangement of the fixing holes of the stator and the clips.

FIG. 17 is a wiring diagram showing coils and a converging portion of extension wires of a first system and a second system of a comparative example.

FIG. 18 is a wiring diagram showing converging portions of extension wires similar to that of FIG. 5.

FIG. 19 is a wiring diagram showing a state in which the coils of the first system and the second system are in the same phase.

FIG. 22 is a diagram explaining an output voltage in the case of the coils of the first system and the second system are in the opposite phases.

DETAILED DESCRIPTION

In recent years, with an increase in the demand for electric power in various vehicles, efforts have been made to improve an output of vehicle generators. Along with this increase in the output, a temperature of a coil wound around a stator of a rotary electric machine is also increasing. One possible measure to prevent the temperature of the coil from increasing is to provide multiple current paths to the coil. JP2010-115041A describes a winding structure that can selectively change output characteristics.

Here, if the coil is made of a single system, the winding that forms the coil continues from a start coil to an end coil and take a round in a circumferential direction. That is, if the coil is a single system, the winding start position and the winding end position of a conductor that forms the coil can be set close to each other. On the other hand, if the coil is made of multiple systems ("n" systems) and is arranged continuously within an angular range obtained by dividing 360 degrees by "n", the winding start position and winding end position of the conductor that forms the coil is separated from each other. Therefore, it is necessary to arrange extension wires over long distance to connection portions between the conductor and lead wires on the stator. However, in the rotary electric machine described in JP2010-115041A, configurations of these extension wires are not considered.

It is an object of the present disclosure to improve a vibration resistance of the extension wires and a heat dissipation properties of coil lead wires by devising an arrangement of the extension wires and lead wires, thereby suppressing temperature rise.

Figure 1:
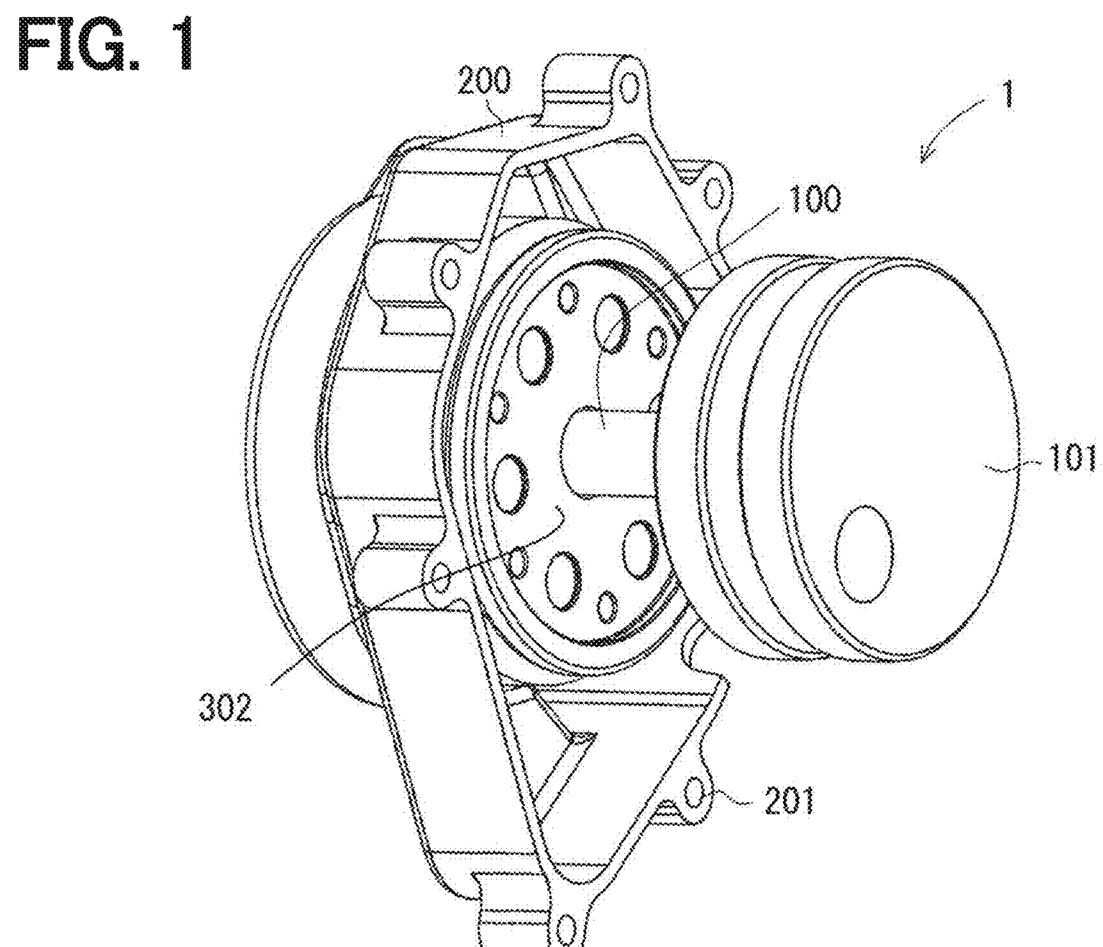
FIG. 1 is a perspective view of a state in which a rotary electric machine is combined with a crankshaft and an engine cover.

An embodiment of this disclosure is described below with reference to the drawings. The term "divide" in this disclosure does not only refer to an act of dividing a single assembly into two or more individual elements. The term "divide" in this disclosure may refer to an act of establishing a boundary between two or more individual elements in a single assembly. A boundary is not a feature that physically isolates an individual element. The boundary is a feature that can distinguish a first individual element from a second individual element. In other words, the word "divide" also means an act of dividing a single assembly into two or more individual elements by boundaries. Moreover, the "a number "x"" of the teeth means the number "x" of poles of the teeth. The term "divide" may also apply to the case where two or more individual elements are grouped together to form a single assembly. In addition, "k-phases" means a number "k" of phases of polyphase AC power. "n-system" means a number "n" of division numbers of systems, and "n-division" means a number "n" of division numbers. FIG. 1 is a perspective view of a state in which a rotary electric machine 1 is combined with a crankshaft 100 and an engine cover 200. A crankweb 101 receives reciprocating motion of a piston (not shown) in a cylinder (not shown) via a connecting rod (not shown) and rotate the crankshaft 100. The crankshaft 100 is made of an iron material with a diameter of about 20 millimeters and is supported by a cylinder block 110 (shown in FIG. 14) in a rotatable manner.

The engine cover 200 covers an opening 111 of the cylinder block 110 and is fixed by bolts to the cylinder block 110 via bolt through holes 201. The engine cover 200 is made of a die-cast aluminum or aluminum alloy and has a thickness of about 4 millimeters. Since the engine cover 200 is continuous to the opening 111 of the cylinder block 110 and an internal environment is the same as that of the cylinder block 110.

Figure 2:
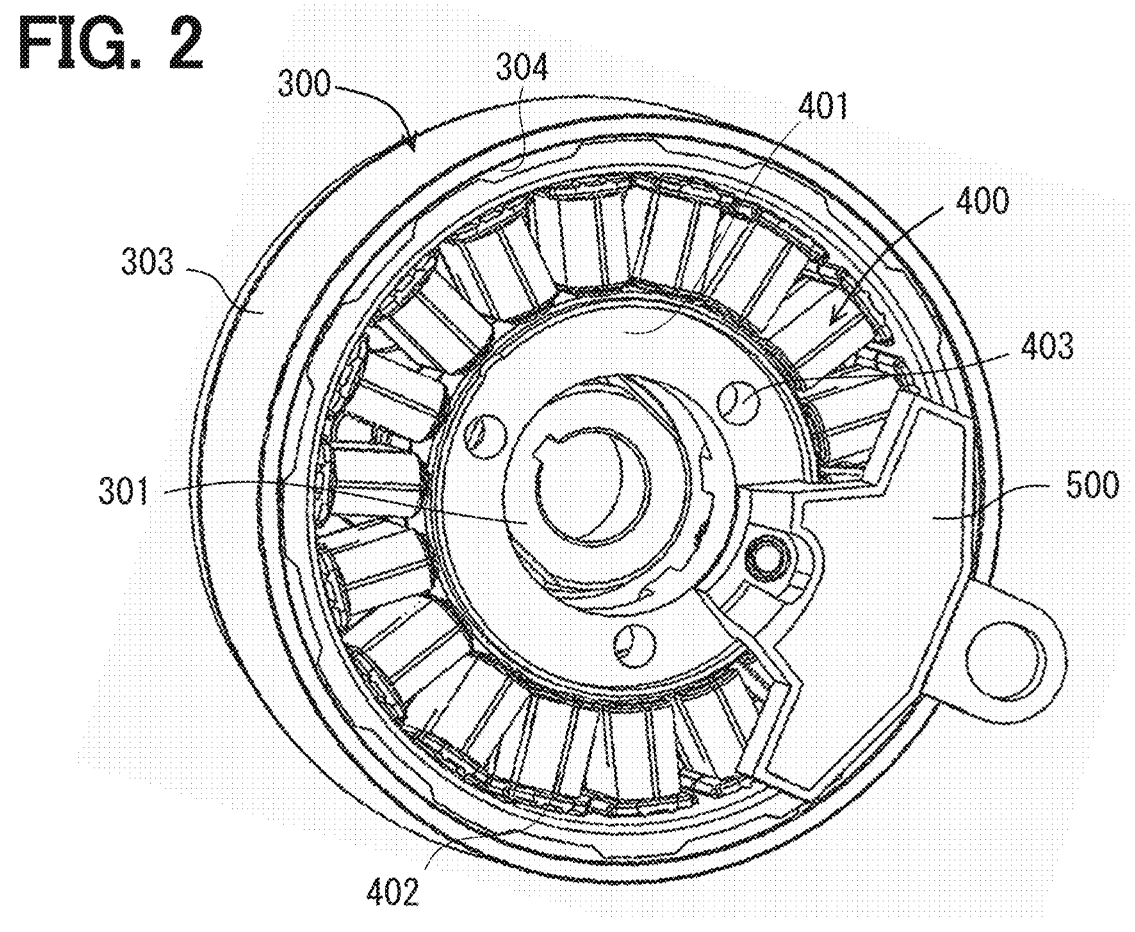
FIG. 2 is a perspective view showing a rotor and a stator.
Figure 14:
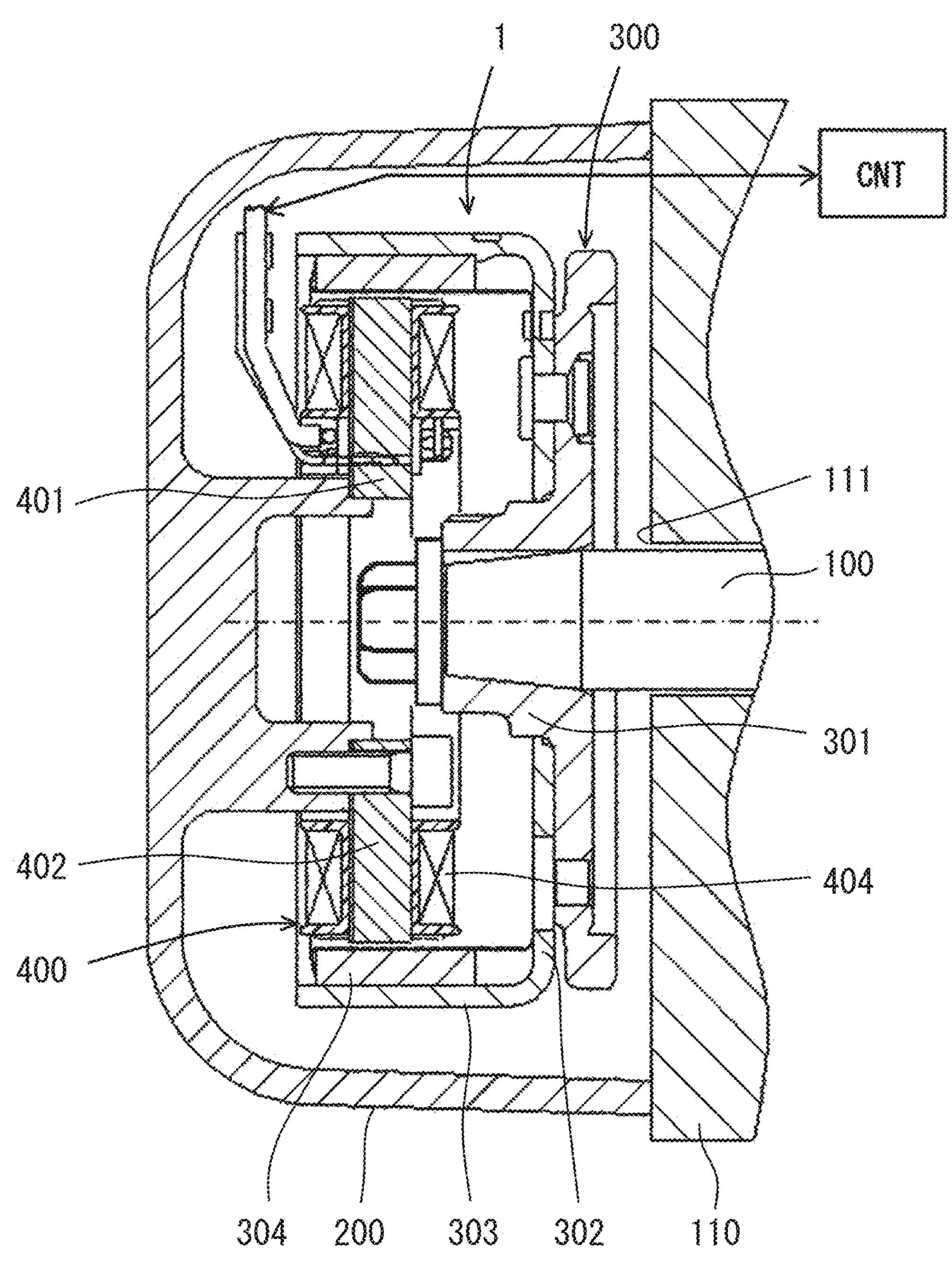
FIG. 14 is a cross-sectional view of a state in which a rotary electric machine is combined with a crankshaft and an engine cover.

A rotor 300 of the rotary electric machine 1 is fixed to the crankshaft 100 at a base portion 301 (shown in FIG. 2 and FIG. 14). Therefore, the rotor 300 rotates integrally with the crankshaft 100. The rotor 300 is made of an iron material and includes a disk portion 302 extending radially outward from the base portion 301 that engages with the crankshaft 100, and a cylindrical portion 303 formed on a radially outer portion of the disk portion 302. As shown in FIG. 2, a set of twelve permanent magnets 304 side by side in a circumferential direction is arranged on an inside of the cylindrical portion 303. A thickness of the permanent magnets 304 is about 4-5 millimeters. The number of magnetic poles of the permanent magnet 304 is not limited to 12 poles, but can be set appropriately to 20 poles, 24 poles, or the like according to the required performance.

Figures 3, 4:
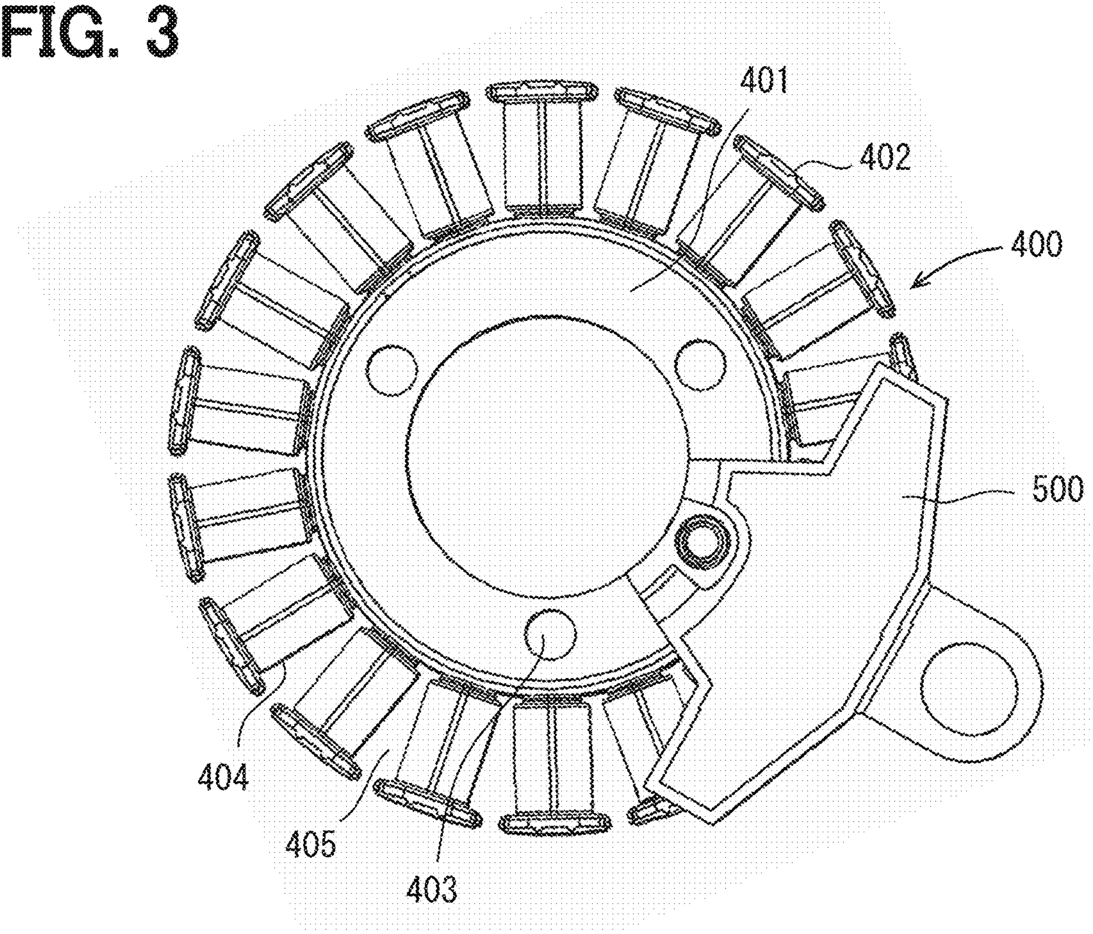
FIG. 3 is a front view showing the stator and a sensor case.
FIG. 4 is a perspective view showing the stator and the sensor case.

A stator 400 is arranged on an inside of the rotor 300 as shown in FIG. 2 and FIG. 14. FIG. 2 is a perspective view of the stator 400 as viewed from a side of the engine cover 200. The stator 400 is made by laminating a plurality of magnetic steel plates, and has a base portion 401 that is attached to the engine cover 200. In this example, the engine cover 200 serves as a fixing portion. The stator 400 has a plurality of teeth 402 formed integrally with a base portion 401 and extending radially outward from the base portion 401. In the example of FIG. 3, the number of the teeth 402 is 18, but the number of the teeth 402 can be changed as appropriate depending on a required performance and the number of magnetic poles. FIG. 3 also shows distal ends of the teeth 402 and the coils 404 wound around the teeth 402. An outer diameter of the stator 400 is about 110-130 millimeters, and an inner diameter of the rotor 300 is such that a minute gap is formed between the outer diameter of the stator 400 and the permanent magnets 304.

The base portion 401 has three fixing holes 403 formed therethrough for fixing the stator 400 to the engine cover 200 with bolts. The base portion 401 also has a sensor case bolt through hole for fixing a sensor case 500 described later to the stator 400.

The teeth portion 402 is electrically insulated by an insulator made of insulating resin such as polyamide, and the coils 404 made of a copper wire or an aluminum wire are wound on the insulator. FIG. 3 is a front view showing the stator 400 and the sensor case 500 while removing the rotor 300 from FIG. 2. FIG. 4 is a perspective view showing the stator 400 and the sensor case 500 from an opposite direction to FIG. 3.

As shown in FIG. 3, a gap 405 is formed between adjacent coils 404, and the gap 405 widens toward a radial outward direction. However, the coils 404 may be wound so that the gap 405 is constant to increase the space factor. As shown in FIG. 4, the sensor case 500 is disposed in the gap 405. The sensor case 500 is molded from a resin such as polyamide reinforced with glass fibers.

The first to fourth Hall sensors 502-505 are each about 2 millimeters×3 millimeters in size, and are molded with resin together with a power supply line, a ground line and a sensor output line. It should be noted that the first to fourth Hall sensors 502-505 themselves are not shown in FIG. 4. Reference numerals 502-505 in FIG. 4 indicate portions of the sensor case 500 where the first to fourth Hall sensors are located.

The first Hall sensor 502 detects a reference position for ignition control. The first Hall sensor 502 is arranged at a different position in the axial direction of the crankshaft 100 from the other second to fourth Hall sensors 503, 504 and 505. More specifically, the first Hall sensor 502 is disposed at the axial center position in the axial direction of the gap 405 between the teeth portions 402. In contrast, the second to fourth Hall sensors 503, 504 and 505 are disposed on a side of the engine cover 200 in the gap 405.

At the position where the first Hall sensor 502 is arranged, there is no reversal from the N-pole to the S-pole at the reference position, and the N-poles are continuous with the three permanent magnets 304. The reference position can be detected by detecting the continuity of these three N-poles. Since the rotor 300 rotates integrally with the crankshaft 100, the reference position indicates the position of the crankshaft 100 in the rotational direction. An ignition timing of a spark plug (not shown) arranged in a cylinder of the engine is controlled by utilizing the fact that the crankshaft 100 is in the reference position and a switching of the magnetic poles of other Hall sensors.

The second to fourth Hall sensors 503, 504 and 505 face the permanent magnets 304 magnetized alternately with the N-pole and the S-pole, and detect positions where the N-pole and the S-pole alternately change. The respective detection positions of the second to fourth Hall sensors 503, 504 and 505 correspond to energization timings of three-phases (a V-phase, a W-phase and a U-phase), and the rotary electric machine 1 is used as a motor as a starter according to this detection position, it controls the supply of voltage to the coils 404 corresponding to the U-phase, the V-phase and the W-phase. If the rotary electric machine 1 is used as a generator, those signals are used as timing signals for controlling currents from the coils 404 corresponding to the U-phase, the V-phase and the W-phase.

In the present disclosure, the three-phase coils are separated into two systems. The three-phase coils on the right side of a dividing line "A" shown in FIG. 5 forms a three-phase electric circuit consisting of three-phase windings of the U-phase, the V-phase and the W-phase. Similarly, the three-phase coils on the left side also has a three phase electric circuit of an X-phase, a Y-phase and a Z-phase. These two systems of three-phase coils, each consisting of a separate electric circuit, are arranged in a left and right separate arrangement. In other words, in the present disclosure, each of the three-phase coils separated into two systems are arranged continuously, and a line separating two systems of three-phase coils is shown as the dividing line "A". That is, each of the separated three-phase coils does not cross the dividing line "A" and enter the region of another three-phase coil.

In FIG. 5, wirings between the conductors 450 of the coils 404 and winding start extension wires 451, 452 and 453 of the three-phase coil and winding end extension wires 455, 456 and 457 of the three-phase coil are shown in a simplified manner. The conductor wires 450 and the winding start extension wires 451, 452 and 453 and the winding end extension wires 455, 456 and 457 of the coils 404 are continuous wires, and are made of copper or aluminum as described above.

The winding start extension wires 451, 452 and 453 of the three-phase coil and the winding end extension wires 455, 456 and 457 of the three-phase coil are connected to a first to third lead wires 460, 461, and 462, respectively. The first to third lead wires 460, 461 and 462 are made of copper. Reference numerals 470, 471 and 472 indicate connection portions between the first to third lead wires 460, 461 and 462 and the winding start extension wires 451, 452 and 453 of the three-phase coil and the winding end extension wires 455, 456 and 457 of the three-phase coil. These are referred to as a first connection portion 470, a second connection portion 471, and a third connection portion 472, respectively. As a result, in the three-phase coils of the same system, the winding start extension wires 451, 452 and 453 and the corresponding winding end extension wires 455, 456 and 457 can be connected to a single lead wires 460, 461 and 462 in a side by side manner.

Next, connection states between the first to third lead wires 460, 461 and 462 and the winding start extension wires 451, 452 and 453 of the three-phase coil and the conductors 450 of the coils 404 are described. The first lead wire 460 is electrically connected to the winding start extension wire 451 of the U-phase coil at a first connection portion 470. The winding start extension wire 451 of the U-phase coil serves as the conductors 450 of the coils 404 indicated as "U1" in FIG. 5, and wound multiple turns around the teeth 402. Therefore, the coil 404 is a concentrated winding in which the conductor is wound many times in succession. Although not shown in FIG. 5, the conductor of the coil 404 of "U1" is continuous with the conductor 450 of the coil 404 designated "U2" in FIG. 5. Also, the conductor of the coil 404 of "U2" is continuous with the conductor 450 of the coil 404 designated "U3" in FIG. 5. That is, the conductor 450 is continuous with a wire wound around the teeth 402 to form a concentrated winding of the coil 404 and a wire (a so-called connecting wire) that connects the coils 404 together.

Similarly, the second lead wire 461 is electrically connected to the winding start extension wire 451 of the V-phase coil at a second connection portion 471. The winding start extension wire 452 of the V-phase coil serves as the conductors 450 of the coils 404 indicated as "V1", "V2" and "V3" in FIG. 5, and is wound multiple turns around the teeth 402 to form a concentrated winding coils 404. It also serves as the conductor 450 that serves as a connecting wire connecting between the coils 404.

The same applies to the W-phase coil. The third lead wire 462 is electrically connected at a third connection portion 472 to the winding start extension wire 452 of the W-phase coil. The winding start extension wire 452 of the W-phase coil serves as the conductors 450 of the coils 404 indicated as "W1", "W2" and "W3" in FIG. 5, and also serves as the conductors 450 that serves as connecting wires connecting the coils 404 together.

The conductors 450 designated as "U3", "V3" and "W3" are continued as they are to become the winding end extension wires 455, 456 and 457 of the three-phase coil. In this manner, the winding start extension wires 451, 452 and 453 of the three-phase coil, the conductors 450 of the three-phase coil 404, and the winding end extension wires 455, 456 and 457 of the three-phase coil are each a single continuous wire.

The winding end extension wire 455 from the "U3" of the coils 404, which is the winding end of the U-phase coils 404, is electrically connected to the second lead wire 461 at the second connection portion 471. The winding end extension wire 456 of the V-phase coil is electrically connected to the third lead wire 462 at the third connection portion 472. The winding end extension wire 457 of the W-phase coil is electrically connected to the first lead wire 460 at the first connection portion 470. As described above, each of the lead wires 460, 461 and 462 connects corresponding two of the winding start extension wires 451, 452 and 453 and the winding end extension wires 455, 456 and 457 in a bundling manner.

Figure 6:
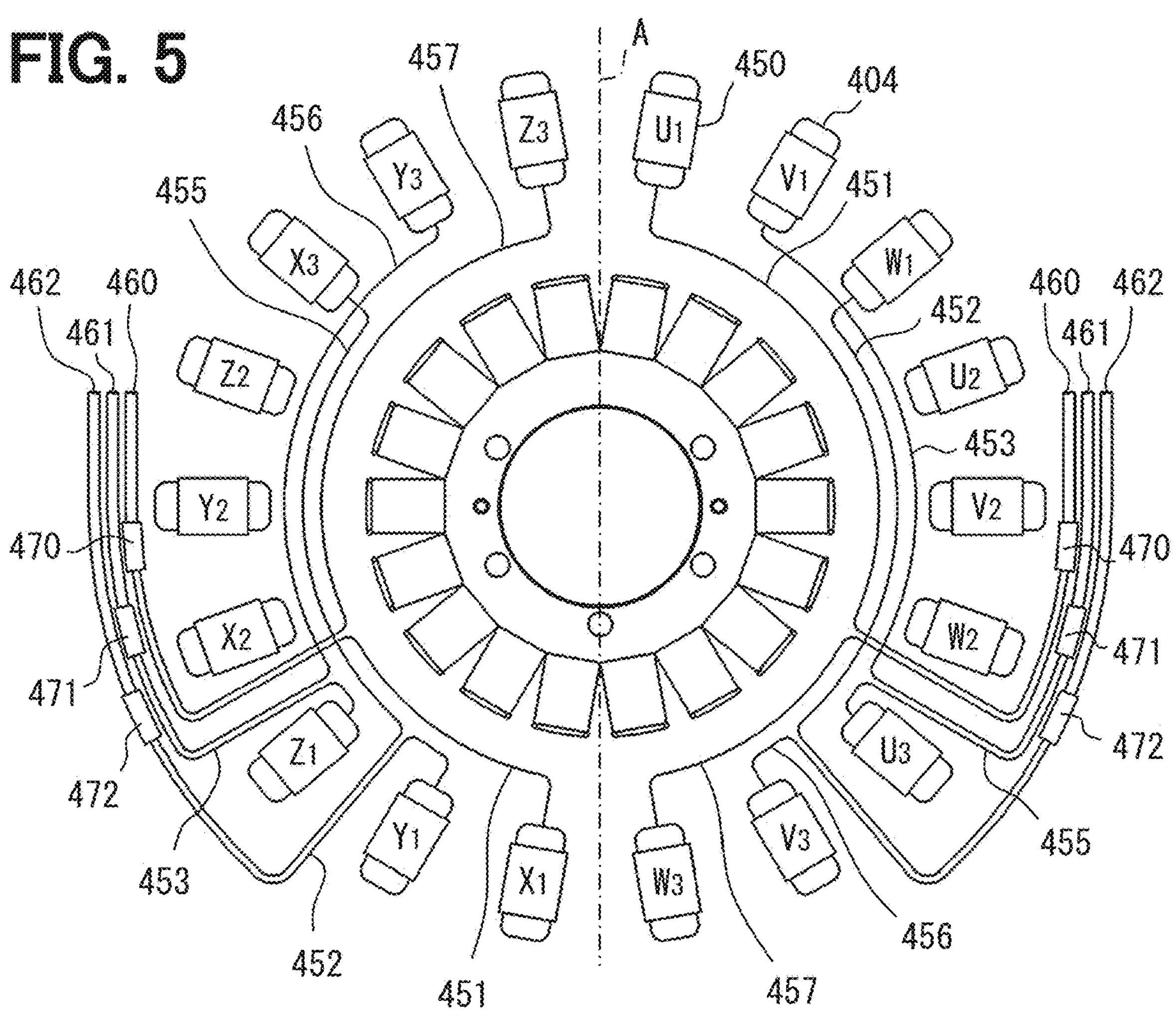
FIG. 6 is a wiring diagram showing coils, extension wires, and lead wires of a first system.

FIG. 6 shows wirings of the winding start extension wires 451, 452 and 453 of the U-phase coil, the V-phase coil, and the W-phase coil, the conductors 450 of the coils 404, and the winding end extension wires 455, 456 and 457 of FIG. 5 in a further simplified manner. The first lead wire 460 is connected to the winding start extension wire 451 of the U-phase coil and the winding end extension wire 457 of the W-phase coil at the first connection portion 470.

The second lead wire 461 is connected to the winding start extension wire 452 of the V-phase coil and the winding end extension wire 455 of the U-phase coil at the second connection portion 471. Similarly, the third lead wire 462 is connected to the winding start extension wire 453 of the W-phase coil and the winding end extension wire 456 of the V-phase coil at the third connection portion 472. As shown in FIG. 6, the wirings of the three-phase coil 404 is the delta-connection.

Figure 7:
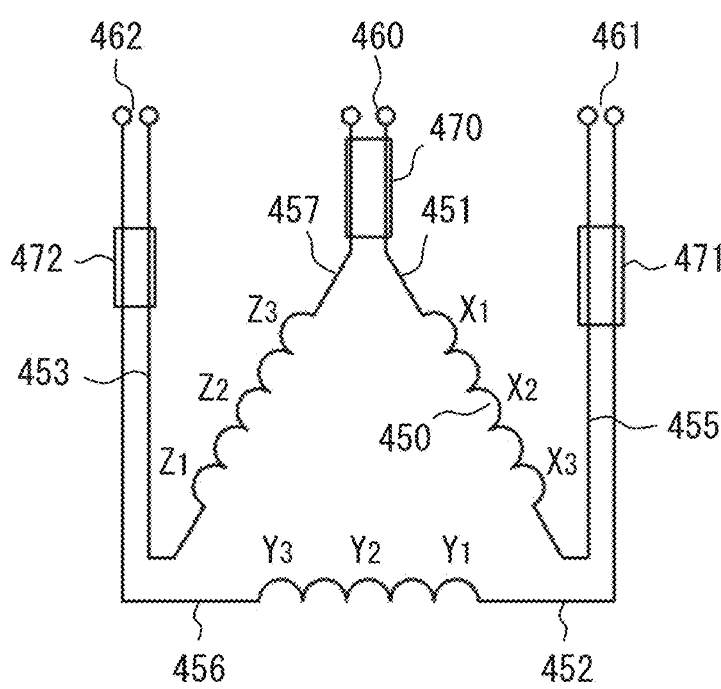
FIG. 7 is a wiring diagram showing coils, extension wires, and lead wires of a second system.

The three-phase coils (the X-phase, the Y-phase and the Z-phase) on the left side of the dividing line "A" shown in FIG. 5 are the same as the three-phase coils (the U-phase, the V-phase and the W-phase) on the right side. In FIG. 5, the X-phase, the Y-phase, and the Z-phase correspond to the U-phase, the V-phase, and the W-phase of the three-phase coil, respectively. Therefore, the coils 404 corresponding to “U1”, “U2”, and “U3” are labeled “X1”, “X2”, and “X3”. The same reference numerals are also used for the wires corresponding to the first to third lead wires and the portions corresponding to the first to third connection portions. The same applies to winding start extension wires 451, 452 and 453 and winding end extension wires 455, 456 and 457 of the three-phase coil. FIG. 7, like FIG. 6, shows an electrical connection state of the X-phase, the Y-phase, and the Z-phase in the delta connection.

Figure 8:
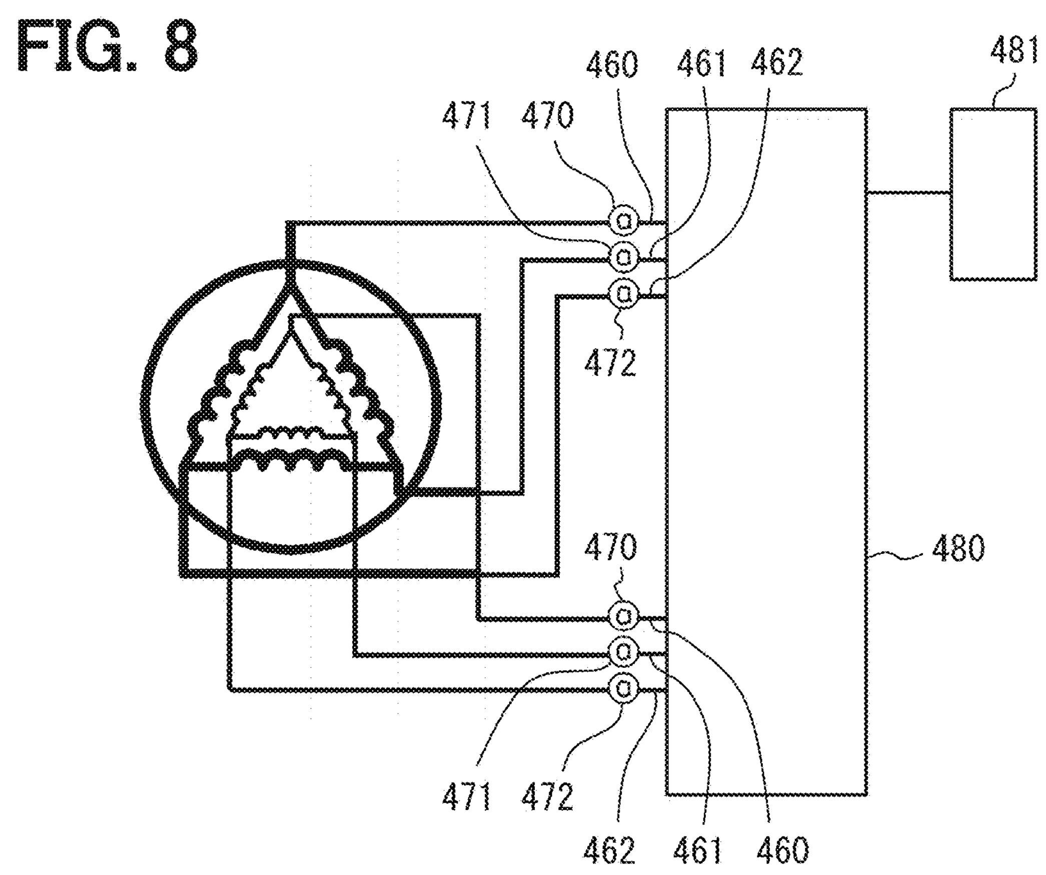
FIG. 8 is a wiring diagram showing coils, extension wires, lead wires and a control device of the first system and the second system.

The first to third lead wires 460, 461 and 462 of the three-phase coils of the U-phase, the V-phase, and the W-phase and the three-phase coils of the X-phase, the Y-phase, and the Z-phase are electrically connected to a control device 480 shown in FIG. 8. As described above, when the rotary electric machine 1 is used as a motor as a starter, the control device 480 controls the power input from the battery 481 to control power supply to the coils 404 corresponding to the U-phase, the V-phase, the W-phase, the X-phase, the Y-phase and the Z-phase. This allows a rotation direction and a rotation speed of the rotary electric machine 1 to be controlled. In addition, since the control device performs conversion of both voltage and current, it is generally referred to as power control.

Also, when the rotary electric machine 1 is used as a generator, the power output from the coils 404 corresponding to the U-phase, the V-phase, the W-phase, the X-phase, the Y-phase and the Z-phase are controlled by the control device 480. The control device 480 converts the three-phase AC power into DC power and charges the battery 481.

Figure 15:
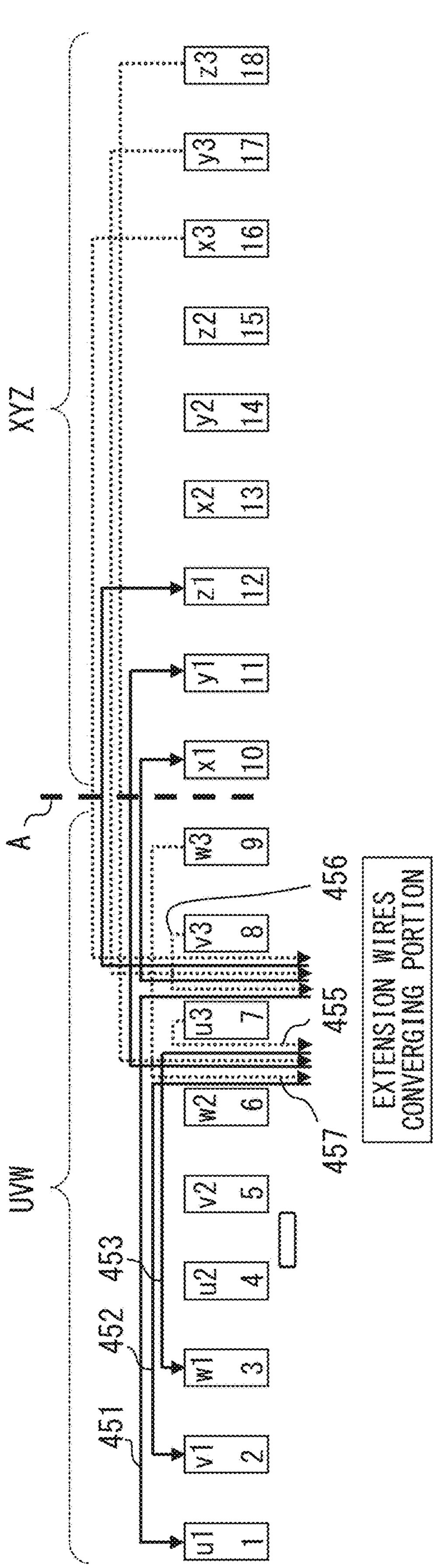
FIG. 15 is a wiring diagram showing coils and extension wires of a first system and a second system of a comparative example.

Here, even if the three-phase coil is divided into two systems, it is also possible to converge the winding start extension wires 451, 452 and 453 and the winding end extension wires 455, 456 and 457 at one location and connect them at the first to third connection portions 470, 471 and 472. However, if they are converged at one location, all of the winding start extension wires 451, 452 and 453 and the winding end extension wires 455, 456 and 457 are concentrated as shown in FIG. 15. In the example of FIG. 15, the winding start extension wires 451, 452 and 453 and the winding end extension wires 455, 456 and 457 are concentrated between the W2-phase coil 404, the U3-phase coil 404 and the V3-phase coil 404. That is, all of the winding start extension wires 451, 452 and 453 and all of the winding end extension wires 455, 456 and 457 are passed between a pair of adjacent coils 404, and are concentrated at that location. The winding start extension wires 451, 452 and 453 and the winding end extension wires 455, 456 and 457 concentrated are bundled together by a clip 490 described later.

In contrast, as shown in FIG. 18, if the winding start extension wires 451, 452 and 453 and the winding end extension wires 455, 456 and 457 of two systems are divided into two, the degree of concentration is reduced by half. That is, it is possible to provide two sets of adjacent coils 404 and half of the winding start extension wires 451, 452 and 453 and half of the winding end extension wires 455, 456 and 457 can be arranged to passe between each of the coils 404, thereby the degree of concentration is reduced by half. In this case, the winding start extension wires 451, 452 and 453 and the winding end extension wires 455, 456 and 457 of the three-phase coils of the U-phase, the V-phase and the W-phase are bundled by a first clip 490. The winding start extension wires 451, 452 and 453 and the winding end extension wires 455, 456 and 457 of the three-phase coils of the X-phase, the Y-phase and the Z-phase are bundled by a second clip 492.

Figure 16:
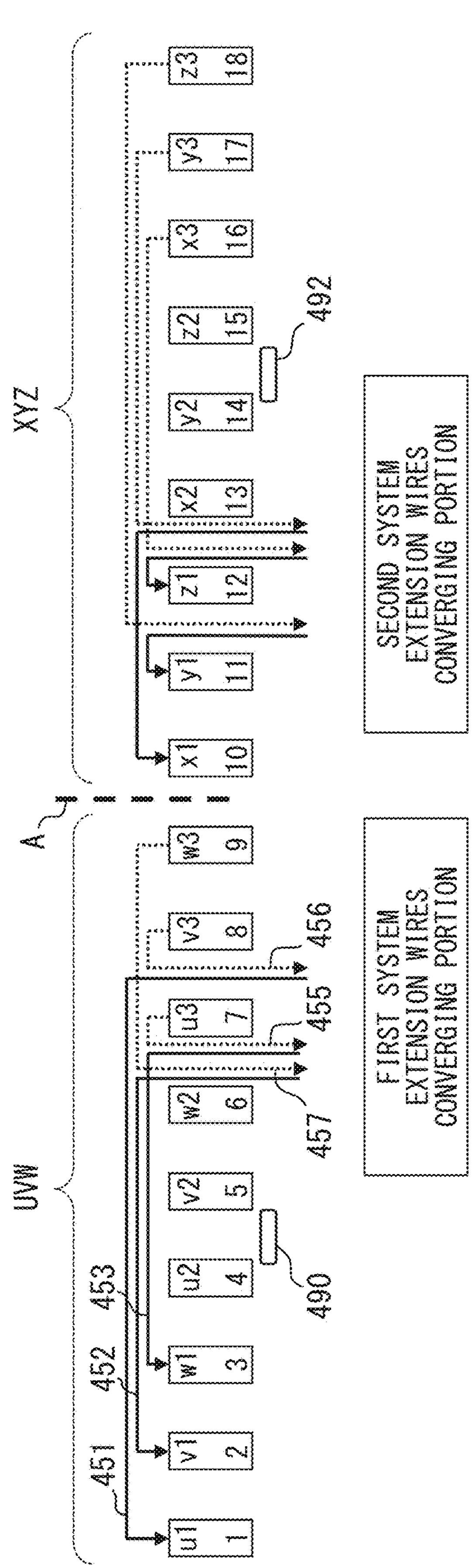
FIG. 16 is a wiring diagram showing extension wires similar to that of FIG. 5 in an exploded manner.

In addition, in FIG. 5 and FIG. 16, the winding start extension wires 451, 452 and 453 and the winding end extension wires 455, 456 and 457 of the three-phase coils are shown in a simplified manner, but in reality, the winding start extension wires 451, 452 and 453 and the winding end extension wires 455, 456 and 457 are arranged between each coils 404 in a sewing manner. Therefore, if they are to be converged at one location, as shown in FIG. 17, many of the winding start extension wires 451, 452 and 453 and the winding end extension wires 455, 456 and 457 are concentrated between the coils 404 other than that near the clip 490. In the example of FIG. 17, a large number of the winding start extension wires 451, 452 and 453 and the winding end extension wires 455, 456 and 457 are arranged between the W3-phase coil 404, the X1-phase coil 404, and the Y1-phase coil 404.

On the other hand, if two systems of the winding start extension wires 451, 452 and 453 and the winding end extension wires 455, 456 and 457 are divided into two, it is possible to avoid the winding start extension wires 451, 452 and 453 and the winding end extension wires 455, 456 and 457 from concentrating between the coils 404. As shown in FIG. 18, even if the winding start extension wires 451, 452 and 453 and the winding end extension wires 455, 456 and 457 are arranged between each coils 404 in a sewing manner, there is no location where they are concentrated between any of the coils 404.

Figure 10:
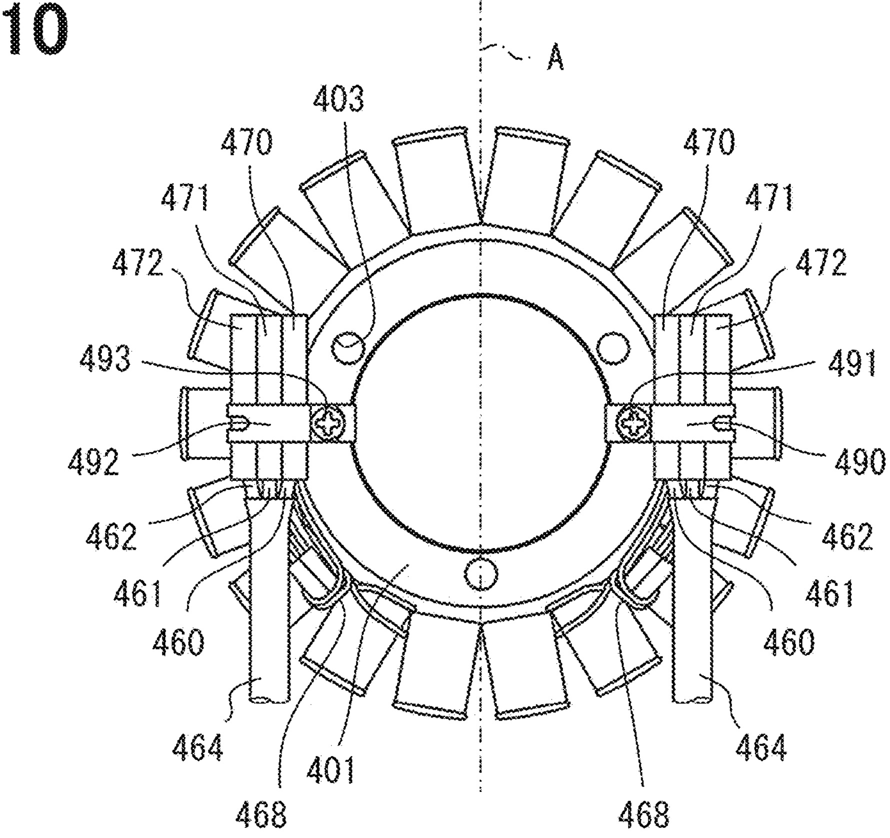
FIG. 10 is a front view showing an arrangement of fixing holes of the stator and clips.

In particular, as shown in FIG. 10, the winding start extension wires 451, 452 and 453 and the winding end extension wires 455, 456 and 457 are converged at converging portions 468 located near the first clip 490 and the second clip 492. That is, the winding start extension wires 451, 452 and 453 and the winding end extension wires 455, 456 and 457 tightly come in contact with the surface of the coil 404 at the converging portion 468 and are fixed to the coil 404 with an adhesive or a powdered resin. The winding start extension wires 451, 452 and 453 and the winding end extension wires 455, 456 and 457 are directed from the converging portion 468 toward the first to third connection portions 470, 471 and 472. In this manner, since the winding start extension wires 451, 452 and 453 and the winding end extension wires 455, 456 and 457 are fixed and directed at the converging portion 468, it is possible to perform soldering easily to the lead wires 460, 461 and 462. Furthermore, it is possible to perform coupling works to the first clip 490 and the second clip 492 easily. The first to third connection portions 470, 471 and 472 of two systems are located within the first clip 490 and the second clip 492, respectively.

As described above, if the winding start extension wires 451, 452 and 453 and the winding end extension wires 455, 456 and 457 for two systems are converged to one location to form one converging portion 468, a large number of the winding start extension wires 451, 452 and 453 and the winding end extension wires 455, 456 and 457 are concentrated in the gap 405 between the coils 404.

The winding start extension wires 451, 452 and 453 and the winding end extension wires 455, 456 and 457 are each adhered to the coils 404 with an adhesive or powdered resin. If the winding start extension wires 451, 452 and 453 and the winding end extension wires 455, 456 and 457 are concentrated, the mass at those locations increases, and resistance to vibration decreases. In particular, since the rotary electric machine 1 is fixed to the engine cover 200 and used in the same environment as the cylinder block 110 of the engine, deterioration of vibration resistance should be avoided.

In addition, since the winding start extension wires 451, 452 and 453 and the winding end extension wires 455, 456 and 457 are arranged between the coils 404, if they are concentrated together, they could obstruct the cooling air flow passing between the coils 404. The coils 404 are cooled by the air within the cylinder block 110 and by engine oil mist. The winding start extension wires 451, 452 and 453 and the winding end extension wires 455, 456 and 457 are arranged between the coils 404, so that the space between the coils 404 becomes narrower, which creates resistance to the flow of air and engine oil.

In the present disclosure, as described above, the coils 404 are arranged in a separate arrangement separated with the dividing line “A” in FIG. 5 including three phases on the right side, the U-phase, the V-phase and the W-phase, and three phases on the left side, the X-phase, the Y-phase and the Z-phase. Therefore, the above-mentioned problem caused by the concentration of the winding start extension wires 451, 452 and 453 and the winding end extension wires 455, 456 and 457 does not occur.

Figure 9:
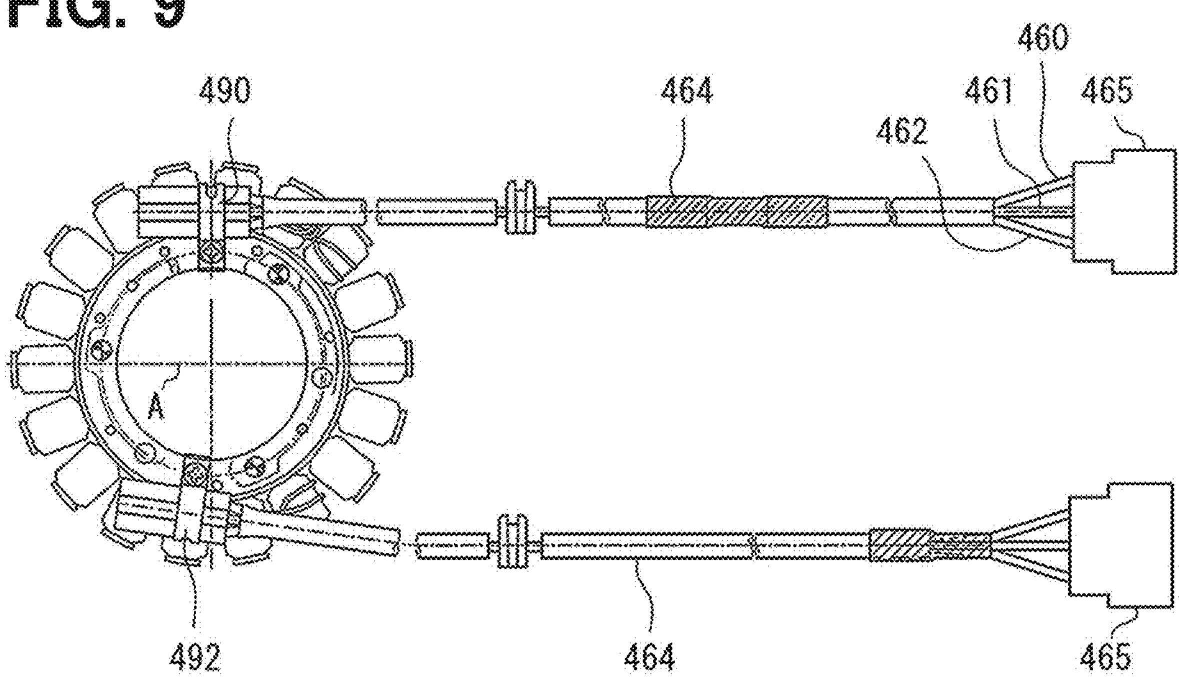
FIG. 9 is a front view showing the coils and the lead wires.

In the present disclosure, as shown in FIG. 9 and FIG. 10, the first to third connection portions 470, 471 and 472 for the U-phase, the V-phase and the W-phase are gathered in one location and fixed by the first clip 490. Three lead wires 461, 462 and 463 are bundled together to form a lead wiring 464. Similarly, the first to third connection parts 470, 471 and 472 for the X-phase, the Y-phase and the Z-phase are also gathered in one place and fixed by the second clip 492, and three lead wires 461, 462 and 463 are bundled together to form the lead wiring 464. This makes it possible to suppress the above-mentioned problems caused by the concentration of extension wires.

The first clip 490 is fixed to the base portion 401 of the stator 400 by a first fixing screw 491. The location of the first clip 490 is substantially middle with respect to the dividing line “A”. That is, the first clip 490 that holds the first to third connecting portions 470, 471 and 472 is disposed at a substantially middle with respect to the dividing line “A”. Here, “substantially middle” refers to a middle of a circumferential direction within which a plurality of coils for the three-phase coil in one system are arranged in the circumferential direction, and is a position around “V2” of the coils 404 which is a middle of “U1” of the coils 404 and “W3” of the coils 404 in FIG. 5. Thereby, it is possible to arrange the winding start extension wires 451, 452 and 453 and the winding end extension wires 455, 456 and 457 for two systems in a well-balanced manner.

In FIG. 10, the first clip 490 and the second clip 492 are disposed at positions that are line-symmetrical with respect to the dividing line “A”. On the other hand, the first clip 490 and the second clip 492 in FIG. 9 are not line-symmetrical with respect to the dividing line “A”, but are slightly shifted from each other. The term “substantially symmetrical” in the present disclosure also includes an example such as that shown in FIG. 9. In order to avoid interference with other components when the rotary electric machine 1 is attached to a two-wheel vehicle, it is permissible to slightly shift the positions of the first clip 490 and the second clip 492.

More specifically, the first clip 490 and the second clip 492 of the present disclosure are fixed to the base portion 401 of the stator 400 near the coil 404 located substantially middle of the dividing line “A”. First, the position of the coil 404 located substantially middle of the dividing line “A” is described. The coil 404 located substantially middle of the dividing line “A” refers to the coil 404 at a symmetrical position and the coil 404 adjacent to that coil 404 if the coil 404 is located at the symmetrical position. Also, when there is no coil 404 in a symmetrical position, it refers to the coil 404 closest to the symmetrical position and the coil 404 that is second closest to the symmetrical position.

Near the coil 404 located substantially middle of the dividing line means that the first clip 490 or the second clip 492 is fixed near the coil 404 specified in this way. Here, “near” includes positions within an angle of about 5 degrees.

The above has been described for the first to third connection portions 470, 471 and 472 of the U-phase coil, the V-phase coil and the W-phase coil, but the same applies the first to third connection portions 470, 471 and 472 of the X-phase coil, the Y-phase coil and the Z-phase coil. The first to third connection portions 470, 471 and 472 of the X-phase coil, the Y-phase coil and the Z-phase coil are fixed to the base portion 401 of the stator 400 by the second clips 492. For fixing, a second fixing screw 493 is used.

Therefore, as shown in FIG. 9 and FIG. 10, the first to third connection portions 470, 471 and 472 of the U-phase coil, the V-phase coil and the W-phase coil and the first to third connection portions 470, 471 and 472 of the X-phase coil, the Y-phase coil and the Z-phase coil are arranged substantially symmetrical on the left and right sides of the dividing line “A”. The same applies to the relationship between the first clip 490 and the first fixing screw 491 and the second clip 492 and the second fixing screw 493. Since the positions are substantially symmetrical with respect to the dividing line “A”, the mass of the lead wires 464 can be supported in a well-balanced manner on the left and right. The length of the lead wiring 464 is about 50-100 centimeters. A terminal of the lead wiring 464 is a connector 465 that is connected to the control device 480.

As described above, the base portion 401 has three fixing holes 403 for bolting the stator 400 to the engine cover 200. In particular, in the present disclosure, the three fixing holes 403 are also disposed substantially symmetrical with respect to the dividing line “A”. Therefore, the stator 400, including the lead wires 460, 461 and 462, can be fixed to the engine cover 200 in a well-balanced manner. Vibrations of the engine are transmitted from the cylinder block 110 through the engine cover 200 to the rotary electric machine 1. More specifically, the vibration is transmitted to the rotary electric machine 1 through the fixing holes 403 in the base portion 401 of the stator 400. For this reason, it is desirable that the fixing holes 403 are substantially symmetrical with respect to the dividing line “A”, so that the symmetry of the first clip 490 and the second clip 492 can be maintained in a vibration system from the engine. In other words, it is possible to coincide behaviors of the winding start extension wires 451, 452 and 453 and the winding end extension wires 455, 456 and 457, the first to third connection portions 470, 471 and 472, and further the first clip 490 and the second clip 492, in the first system and the second system, by arranging both the fixing holes 403 and the first clip 490 and the second clip 492 in a substantially symmetrical manner with respect to the dividing line “A”.

In particular, in this example, the fixing screw 491 for fixing the first clip 490 and the fixing screw 493 for fixing the second clip 492 are both located near the fixing holes 403 (within about 30 degrees). The vibration of the stator 400, including resonance, becomes larger the further away from the fixing holes 403. In this example, the vibration resistance of the first clip 490 and second clip 492 can be improved by being located near the fixing holes 403.

In this example, lead wirings 464 from the first clip 490 and the second clip 492 are arranged to extend out in the same direction. Therefore, three lead wires 461, 462 and 463 and the first to third connection portions 470, 471 and 472 can be soldered from the same direction, improving work performances. The same applies to work relating the connector 465 of assembling to the control device 480 and assembling to a mating connector extending from the control device 480.

Figure 21:
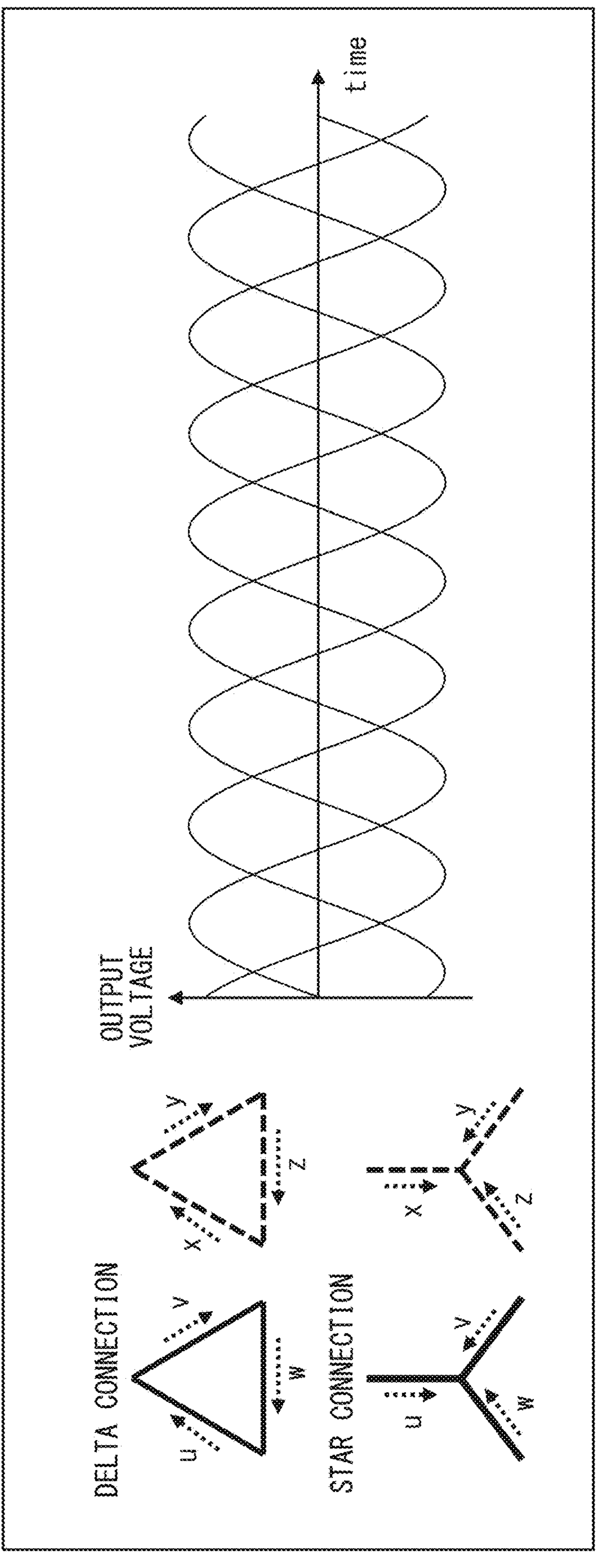
FIG. 21 is a diagram explaining an output voltage in the case of the coils of the first system and the second system are in the same phase.

In addition, in this example, vibrations caused by the rotary electric machine 1 itself are also reduced by providing two systems. For example, as shown in FIG. 19, it is possible to wind the conductors 450 of two systems of the three-phase coils in the same phase by arranging winding directions of the concentrated windings into the same direction (the clockwise in FIG. 19). In this case, two systems of the three-phase coils have the same output phase. Therefore, as shown in FIG. 21, whether the coil is the delta connection or the star connection, an induced electromotive force is generated in the coils 404 at the same time with the same vector. That is, one system (the U-phase, the V-phase and the W-phase) and the other system (the X-phase, the Y-phase and the Z-phase) are in the same phase, and the output voltages are not symmetrical at any timing. In the star connection, the winding start extension wires 451, 452 and 453 and the winding end extension wires 455, 456 and 457 are electrically connected to a single corresponding lead wire.

Figure 20:
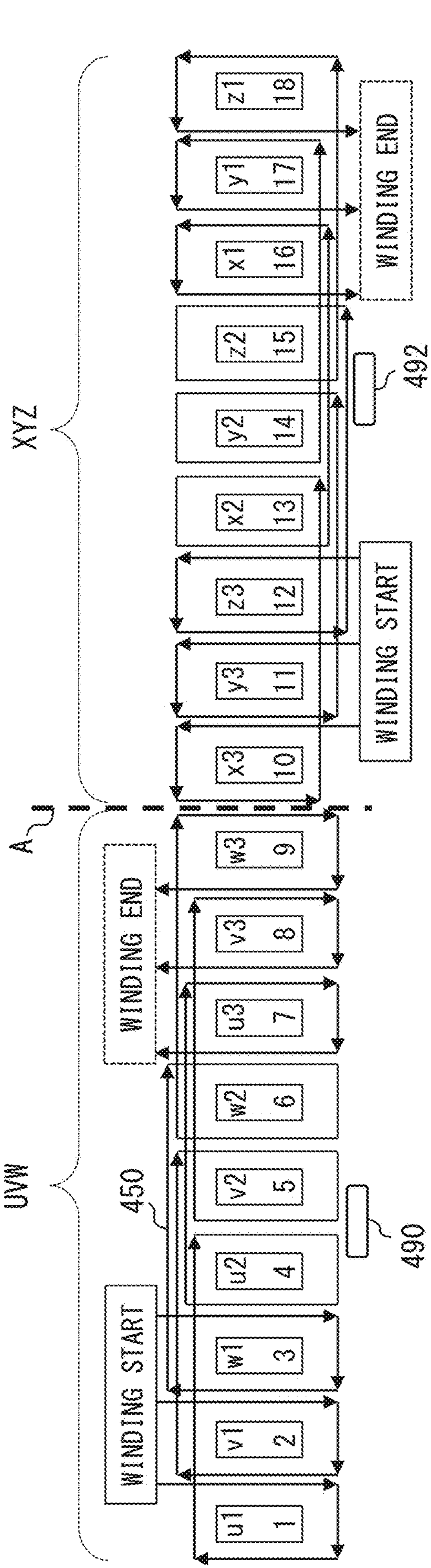
FIG. 20 is a wiring diagram showing a state in which the coils of the first and second systems are in opposite phases.
Figure 22:
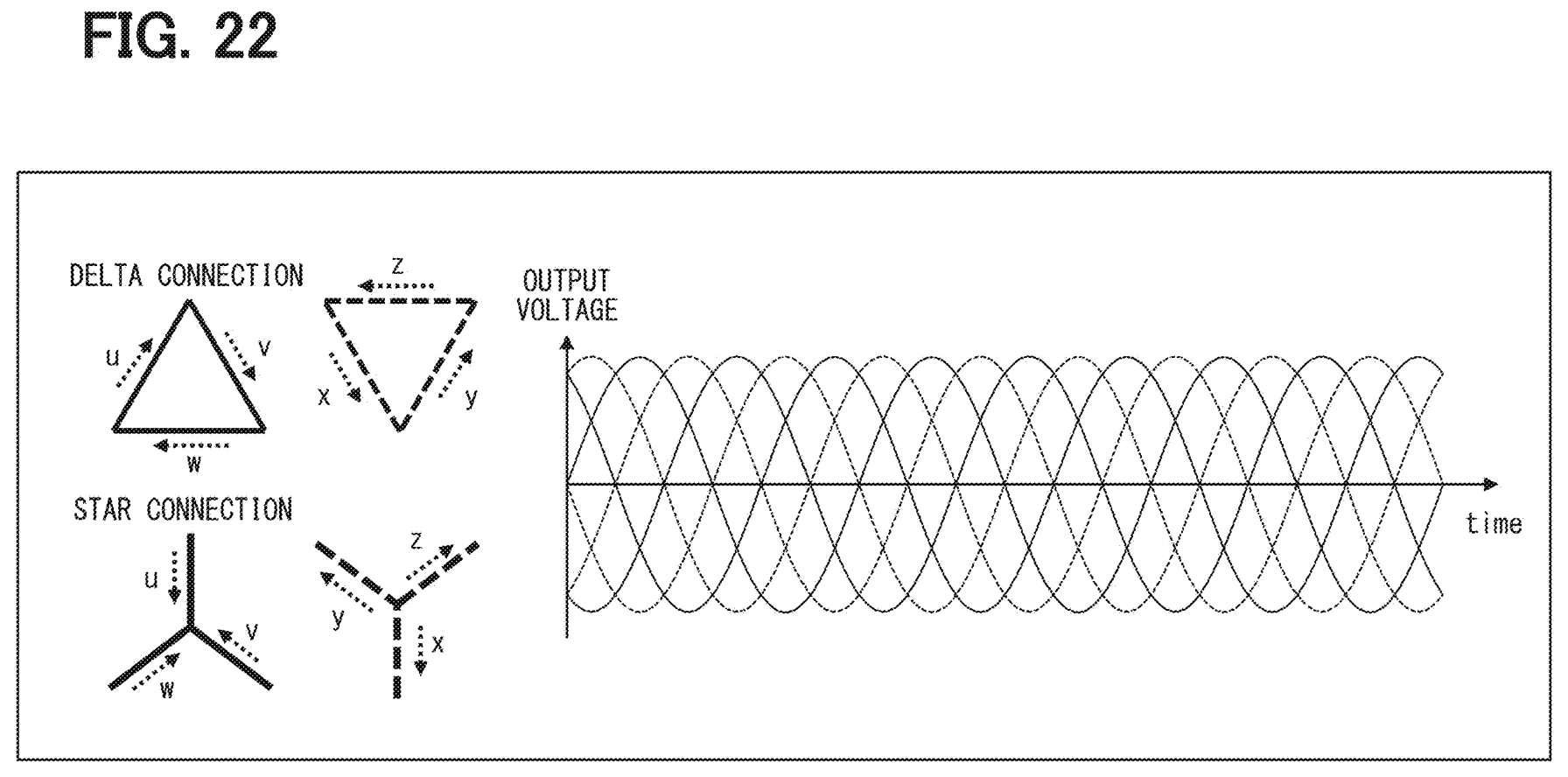

In contrast, as shown in FIG. 20, if the conductors 450 of two systems of the three-phase coils are wound in opposite phases, the output phases of two systems of the three-phase coils are opposite to each other. That is, in FIG. 20, the first system of the U-phase coils, the V-phase coils and the W-phase coils is concentratedly wound in the clockwise direction, and the second system of the X-phase coils, the Y-phase coils and the Z-phase coils is concentratedly wound in the counterclockwise direction. In this way, if the winding directions of the concentrated windings are different from each other, the output phases are reversed. Therefore, as shown in FIG. 22, the first system (the U-phase, the V-phase and the W-phase) and the second system (the X-phase, the Y-phase and the Z-phase) demonstrate shifted phases by 180 degrees. As a result, the output voltage is symmetrical at any given time. The symmetry of the output voltage applies when the rotary electric machine 1 is used as a generator, but it is the same when it is used as a starter. If it is used as a starter, there is symmetry in the input voltage, and there is symmetry in both applications of the generator and the starter. As a result, vibrations of opposite phases are generated in the stator 400, and the vibrations can be cancelled out by each other. As a result, it is possible to suppress vibration of the stator 400 due to excitation of the coils 404, and it is also possible to suppress the generation of abnormal noise, such as magneto-strictive noise, caused by vibration of the stator 400. The same applies whether the winding of the coils 404 is the delta connection or the star connection, as in the example of FIG. 21.

In this example, taking the above into consideration, two systems of the three-phase coils are arranged to have opposite phases. FIG. 19 and FIG. 20 only show the conductors 450 and do not show the winding start extension wires 451, 452 and 453 and the winding end extension wires 455, 456 and 457, but the conductors 450, the winding start extension wires 451, 452 and 453 and the winding end extension wires 455, 456 and 457 are continuous wires, similar to the above description.

Figure 11:
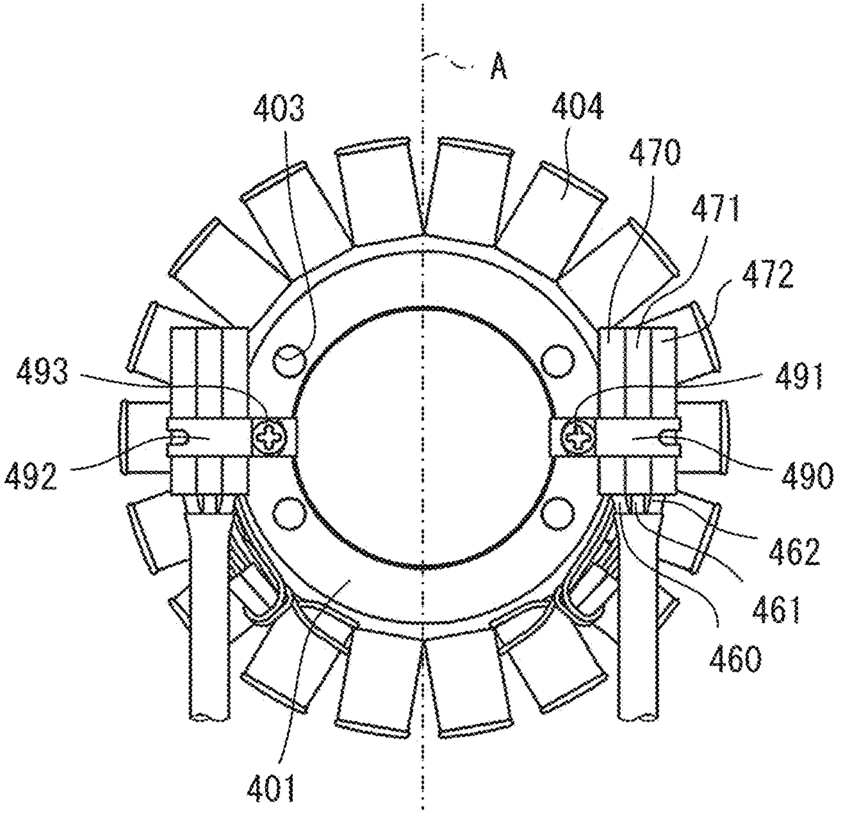
FIG. 11 is a front view showing another example of an arrangement of the fixing holes of the stator and the clips.

The number of fixing holes 403 is not limited to three. FIG. 11 shows an example in which the fixing holes 403 are provided at four locations. In the example of FIG. 11, the fixing holes 403 are also arranged substantially symmetrical with respect to the dividing line "A". Even with this arrangement, the stator 400 can be fixed to the engine cover in a well-balanced manner.

Figure 12:
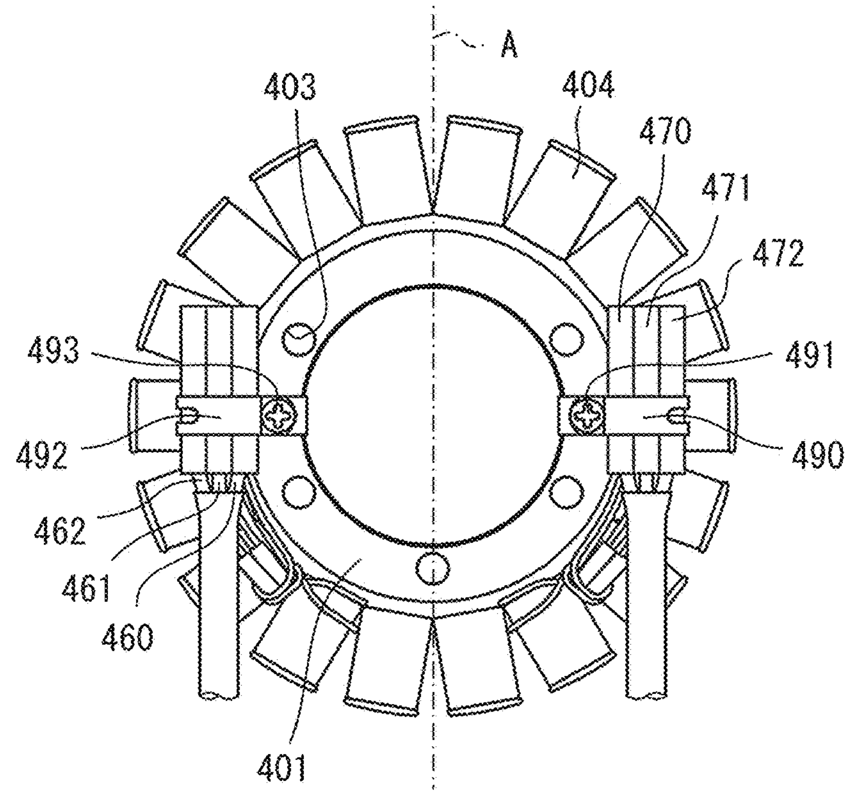
FIG. 12 is a front view showing another example of an arrangement of the fixing holes of the stator and the clips.

FIG. 12 shows an example in which five fixing holes 403 are provided, even in this arrangement, the fixing holes 403 are arranged substantially symmetrical with respect to the dividing line "A". Therefore, even with this arrangement, the stator 400 can be fixed to the engine cover in a well-balanced manner.

Figure 13:
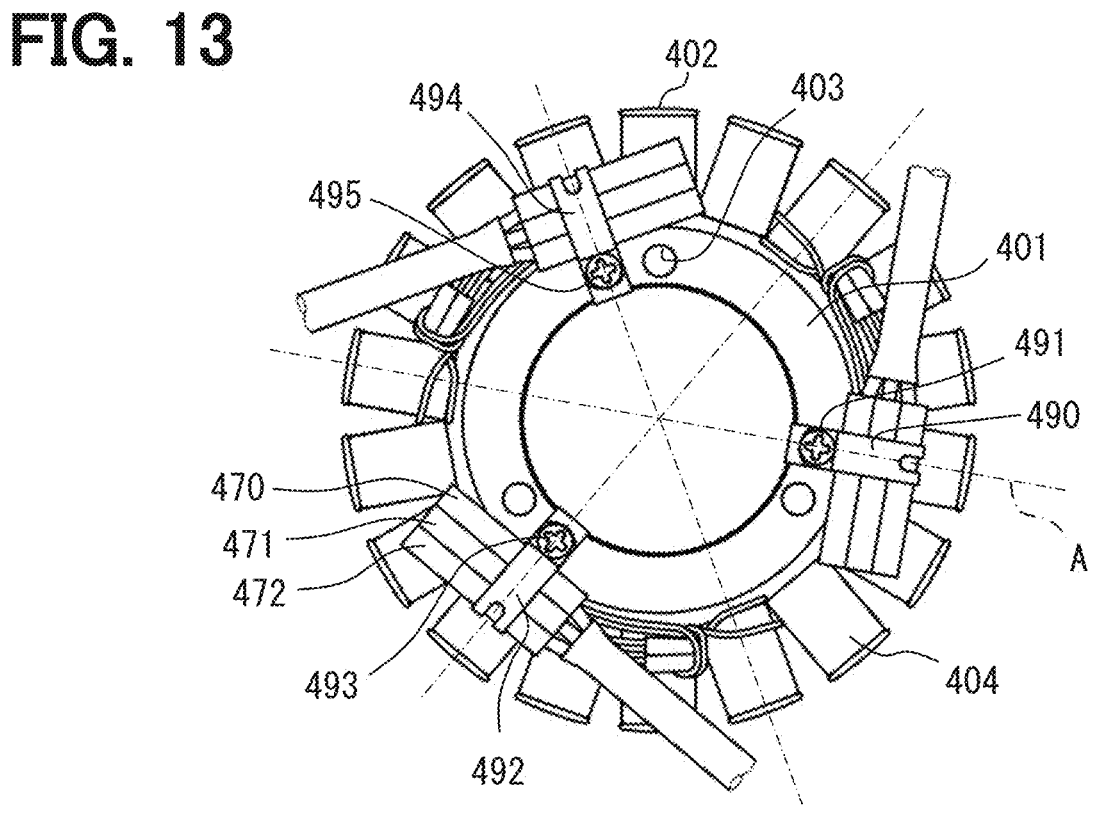

Furthermore, in the above example, the coils 404 are divided into two systems, but it is also possible to divide them into three or more systems. FIG. 13 shows an example in which the three-phase coils 404 are divided into three systems. In this example, the first to third connection portions 470, 471 and 472 of the third system are fixed to the base portion 401 of the stator 400 by a third clip 494 and a third fixing screw 495. In the example of FIG. 13, there are three fixing holes 403, and the arrangement of the fixing holes 403 is substantially symmetrical with respect to a center point of the division line "A". It is possible to arrange three systems of wirings (the first clip 40, the second clip 492, the third clip 494, etc.) in this arrangement of the fixing holes 403 in a well-balanced manner. Therefore, in the present disclosure, line symmetry with respect to the division line "A" means point symmetry with respect to the center point where the dividing lines "A" intersect when there are three or more dividing lines.

In the above example, the coils 404 are wound in three phases, but the number of phases can be changed. The present disclosure may be used in the rotary electric machine 1 having a single-phase or a five-phase. In the above example, the winding start extension wires 451, 452 and 453, the conductors 450 for the coils 404, and the winding end extension wires 455, 456 and 457 for the tree-phase are formed into a single continuous wire. This is a good example because of the ease of wiring. However, the wirings does not necessarily have to be continuous. The coils 404 may be formed by winding around the teeth 402, and the connecting wires between the coils 404 may be electrically connected by separate conductors 450. The winding start extension wires 451, 452 and 453 and the conductors 450 for the coils 404 may be provided by separate wires and are electrically connected. Similarly, the conductor 450 and the winding end extension wires 455, 456 and 457 may be separate wires.

Furthermore, the materials and dimensions shown in the above examples are merely examples and can be changed in various ways depending on the required performance, etc.

What is claimed is:

1. A rotary electric machine, comprising:

a rotor having a plurality of permanent magnets arranged in a circumferential direction and rotating together with a shaft;

a stator including a base portion which has a disk-shape and is fixed to a fixing portion, teeth with a number "x" extending radially outward from the base portion, and coils with a number "x" arranged on the teeth and formed by winding conductors, wherein the teeth has radial outer ends facing the permanent magnets;

lead wires electrically connected to the conductors;

winding start extension wires and winding end extension wires that connect the lead wires to winding start terminals of the coils and winding end terminals of the coils of the conductors;

clips which fix connection portions between the winding start extension wires and the winding end extension wires and the lead wires to the stator; and a control device electrically connected to the lead wires to control input/output power of the coils, wherein the control device controls current supply to the coils in a number "k" of phases, and wherein the coils are divided into "n" systems, where "n" is a natural number that is equal to or greater than 2 and equal to or less than a number obtained by dividing the number "x" of the teeth by the number "k" of the phases of the coils, and n-divided coils are continuously arranged within an angular range obtained by dividing 360 degrees by "n", and wherein the conductor is wound continuously in a circumferential direction to provide the coils in the same phase having a number which is obtained by dividing the number "x" of the teeth by "n" and the number "k" of the phases of the coils, and wherein a number of the clips is "n", and wherein the clips are fixed to the base portion of the stator near a coil that are located substantially middle of a dividing line that divides the coils into "n", and wherein the winding start extension wires and the winding end extension wires are arranged in the teeth in a sewing manner and are converged at a converging portion located near a position where the clip is fixed.

2. The rotary electric machine according to claim 1, wherein the base portion is fixed to the fixing portion through fixing holes, and wherein the fixing holes are arranged substantially symmetrical with respect to a dividing line that divides the coils into "n".

3. The rotary electric machine according to claim 1, wherein the control device controls the input and output power of the coils to three phases, and wherein "n" is an even number, and wherein the control device controls current supply so that input and output powers are in opposite phases by arranging winding directions of the coils belonging to an odd-numbered system and the coils belonging to an even-numbered system in opposite directions.

4. A rotary electric machine, comprising:

a rotor having permanent magnets providing a plurality of magnetic poles arranged along a circumferential direction;

a stator including a base portion having a disk-shape, a plurality of teeth extending radially outward from the base portion and having radially outer ends facing the permanent magnets, and a plurality of coils arranged on each of the plurality of teeth and formed by winding conductors;

a plurality of winding start extension wires and a plurality of winding end extension wires provided by the conductors and extending along the stator from winding start terminals of the coils and winding end terminals of the coils, and a plurality of lead wires electrically connected at a plurality of connection portions;

a plurality of clips which fix the plurality of connection portions to the stator, wherein a number of poles of the plurality of teeth is "x", and wherein the coils are divided into a plurality of systems by a division number "n", and wherein the coils belonging to each system provide windings having a number of phases "k", and wherein the division number "n" is a natural number that is equal to or greater than 2 and is equal to or smaller than the number obtained by dividing the number of poles "x" by the number of phases "k", and wherein the coils belonging to each system are arranged continuously within an angular range obtained by dividing 360 degrees by the division number "n", and wherein a number, which is calculated by dividing the number of poles "x" by the division number "n" and the number of phases "k", of the coils are wound by the conductor that is series and continuous along the circumferential direction in each one of the systems, and wherein a number of the plurality of clips is equal to the division number "n", and wherein the plurality of clips are fixed to the base portion near the coils located substantially middle of a dividing line that divides the coils, and wherein the winding start extension wires and the winding end extension wires are arranged in the teeth in a sewing manner and are converged at converging portions located near positions where the clips are fixed.

5. The rotary electric machine according to claim 4, wherein the base portion has a plurality of fixing holes for fixing to a fixing portion which is a fixing object, and wherein the fixing holes are arranged substantially symmetrical with respect to the dividing line.

6. The rotary electric machine according to claim 4, wherein the number of phases "k" is 3, and wherein the division number "n" is an even number, and wherein the coils belonging to an odd-numbered system and the coils belonging to an even-numbered system are wound in opposite directions.

7. The rotary electric machine according to claim 6, further comprising a control device which is electrically connected to the plurality of lead wires and controls input/output power of the plurality of coils to an AC having a number of phases "k", wherein the control device controls so that input and output powers of the coils belonging to an odd-numbered system and input and output powers of the coils belonging to an even-numbered system in opposite directions.

* * * * *